US010353370B2

(12) United States Patent
Takeuchi et al.

(10) Patent No.: US 10,353,370 B2
(45) Date of Patent: Jul. 16, 2019

(54) PROGRAMMABLE LOGIC CONTROLLER, CONTROL METHOD THEREOF AND CONTORL PROGRAM THEREOF

(71) Applicant: OMRON Corporation, Kyoto (JP)

(72) Inventors: Yoshitaka Takeuchi, Otsu (JP); Hisanori Igarashi, Muko (JP); Yoichi Kurokawa, Kyoto (JP); Masanori Ota, Otsu (JP)

(73) Assignee: OMRON Corporation, Kyoto (JP)

( * ) Notice: Subject to any disclaimer, the term of this patent is extended or adjusted under 35 U.S.C. 154(b) by 235 days.

(21) Appl. No.: 15/378,058

(22) Filed: Dec. 14, 2016

(65) Prior Publication Data

US 2017/0248932 A1  Aug. 31, 2017

(30) Foreign Application Priority Data

Feb. 26, 2016 (JP) .................................. 2016-036444

(51) Int. Cl.
*G05B 19/05* (2006.01)
(52) U.S. Cl.
CPC ......... *G05B 19/056* (2013.01); *G05B 19/054* (2013.01); *G05B 2219/13004* (2013.01); *G05B 2219/15013* (2013.01)
(58) Field of Classification Search
CPC ................ G05B 19/056; G05B 19/054; G05B 2219/13004; G05B 2219/15013
USPC .......................................................... 700/86
See application file for complete search history.

(56) References Cited

U.S. PATENT DOCUMENTS

| 5,713,036 A | 1/1998 | Kamiguchi et al. |
| 2012/0277885 A1 | 11/2012 | Kuo et al. |
| 2016/0098028 A1* | 4/2016 | Tanide ................. G05B 19/056 700/86 |

FOREIGN PATENT DOCUMENTS

| CN | 104937508 | 9/2015 |
| CN | 105209986 | 12/2015 |
| JP | H07319512 | 12/1995 |
| JP | H09-044212 | 2/1997 |
| JP | 2014199485 | * 10/2014 |
| WO | 2014184962 | 11/2014 |

OTHER PUBLICATIONS

"Office Action of Japan Counterpart Application," with machine English translation thereof, dated Aug. 21, 2018, p. 1-p. 6.
Siemens, "Industry Automation and Drive Technologies—SCE," TIA Training Manual Module P01_02, Dec. 1, 2010, Available at: http://w3.siemens.com/mcms/sce/de/fortbildungen/ausbildungsunterlagen/hochschul-module/tabcardseiten/Documents/V7.0/eP01-02_hardware_configuration_RC1012.pdf.

(Continued)

*Primary Examiner* — Fernando Hidalgo
(74) *Attorney, Agent, or Firm* — JCIPRNET

(57) ABSTRACT

A programmable logic controller (10) is connected to external equipment (40) through a serial communication unit (30), and the programmable logic controller (10) includes: a memory (7), including a user program (11) and a setting document (13), where the user program (11) records both of a command for the communication interface device and command target information thereof, and the setting document (13) saves address information corresponding to the command target information; and a processor (8), reading the user program (11) and the setting document (13) to execute the command.

9 Claims, 14 Drawing Sheets

(56) References Cited

OTHER PUBLICATIONS

"Search Report of Europe Counterpart Application", dated Jun. 16, 2017, p. 1-p. 8.
"Office Action of China Counterpart Application," dated Nov. 21, 2018, with English translation thereof, p. 1-p. 24.
"Office Action of Europe Counterpart Application", dated Feb. 4, 2019, pp. 1-7.
"Office Action of Japan Counterpart Application", dated Apr. 2, 2019, with English translation thereof, pp. 1-7.

* cited by examiner

PROGRAMMABLE LOGIC CONTROLLER, CONTROL METHOD THEREOF AND CONTORL PROGRAM THEREOF

CROSS REFERENCE TO RELATED APPLICATIONS

This application claims the priority benefit of Japanese Patent Application No. 2016-036444, filed on Feb. 26, 2016. The entirety of the above-mentioned patent application is hereby incorporated by reference herein and made a part of this specification.

BACKGROUND OF THE INVENTION

Field of the Invention

The invention relates to a programmable logic controller.

Description of Related Art

A programmable logic controller (PLC) is connected to external equipment through a communication interface device. For example, the external equipment (for example, a bar code reader) adapted to serial communication is connected to a specific port of the communication interface device, and the external equipment and the PLC transceives data through the specific port. In this case, the PLC sends a command to the communication interface device to send data to the external equipment through the specific port, or sends a command to the communication interface device to receive data from the external equipment through the specific port. These commands are recorded in a user program of the PLC.

The communication interface device is sometimes directly installed on a connector of the PLC or sometimes installed on a coupler (slave) on a field network taking the PLC as a master, and when a user records the aforementioned commands in the user program, a connection position of the communication interface device (i.e. whether the communication interface device is directly installed on the connector of the PLC or installed on the coupler on the field network) has to be recognized for recording the commands.

EXISTING TECHNICAL LITERATURE

Patent Literature

Patent literature 1: Japan Patent publication No. 9-44212 (published on Feb. 14, 1997)

SUMMARY OF THE INVENTION

Problem to be Resolved by the Invention

The prior art has following problems: the command has to be rewritten according to the connection position (address) of the communication interface device, and if the connection position of the communication interface device is changed, a user program has to be accordingly changed.

The invention reduces the time required for changing the user program along with the change of the connection position of the communication interface device.

Technical Means for Resolving the Problem

The invention provides a programmable logic controller, which is connected to external equipment through a communication interface device, and the programmable logic controller includes a memory, containing a user program and a setting document, where the user program records both of a command for the communication interface device and command target information thereof, and the setting document saves address information corresponding to the command target information; and a processor, reading the user program and the setting document to execute the command for the communication interface device.

According to the above structure, the command and the command target information thereof are recorded in the user program, and the address information corresponding to the command target information is separately saved in the setting document. Therefore, in case that the connection position (address) of the communication interface device is changed, the setting document can be changed without changing the user program or changing of the user program can be set to the minimum.

In an embodiment of the invention, the command target information includes a type, an identity and a port number of the communication interface device.

In an embodiment of the invention, the processor executes the command based on the command target information, the address information and structure information of a system connected to the programmable logic controller and the communication interface device.

In an embodiment of the invention, the command target information is an input variation of a function block of the command.

In an embodiment of the invention, the communication interface device is a serial communication unit installed on a coupler unit, or on a connector of the programmable logic controller, where the coupler unit is connected to the programmable logic controller through a field network.

In an embodiment of the invention, the communication interface device is an option board (communication board) installed in a slot of the programmable logic controller.

In an embodiment of the invention, the memory stores a structure document recording the structure information of the system.

The invention provides a control method of a programmable logic controller, where the programmable logic controller is connected to external equipment through a communication interface device, and the control method of the programmable logic controller includes a step of reading a user program and a setting document, where the user program records both of a command for the communication interface device and command target information thereof, and the setting document saves address information corresponding to the command target information; and a step of processing the command for the communication interface device.

The invention provides a control program of a programmable logic controller, where the programmable logic controller is connected to external equipment through a communication interface device, and a processor of the programmable logic control executes following steps according to the control program of the programmable logic controller: a step of reading a user program and a setting document, where the user program records both of a command for the communication interface device and command target information thereof, and the setting document saves address information corresponding to the command target information; and a step of processing the command for the communication interface device.

Effect of the Invention

The programmable logic controller of the invention reduces the time required for changing the user program taken place along with the change of the connection position of the communication interface device.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
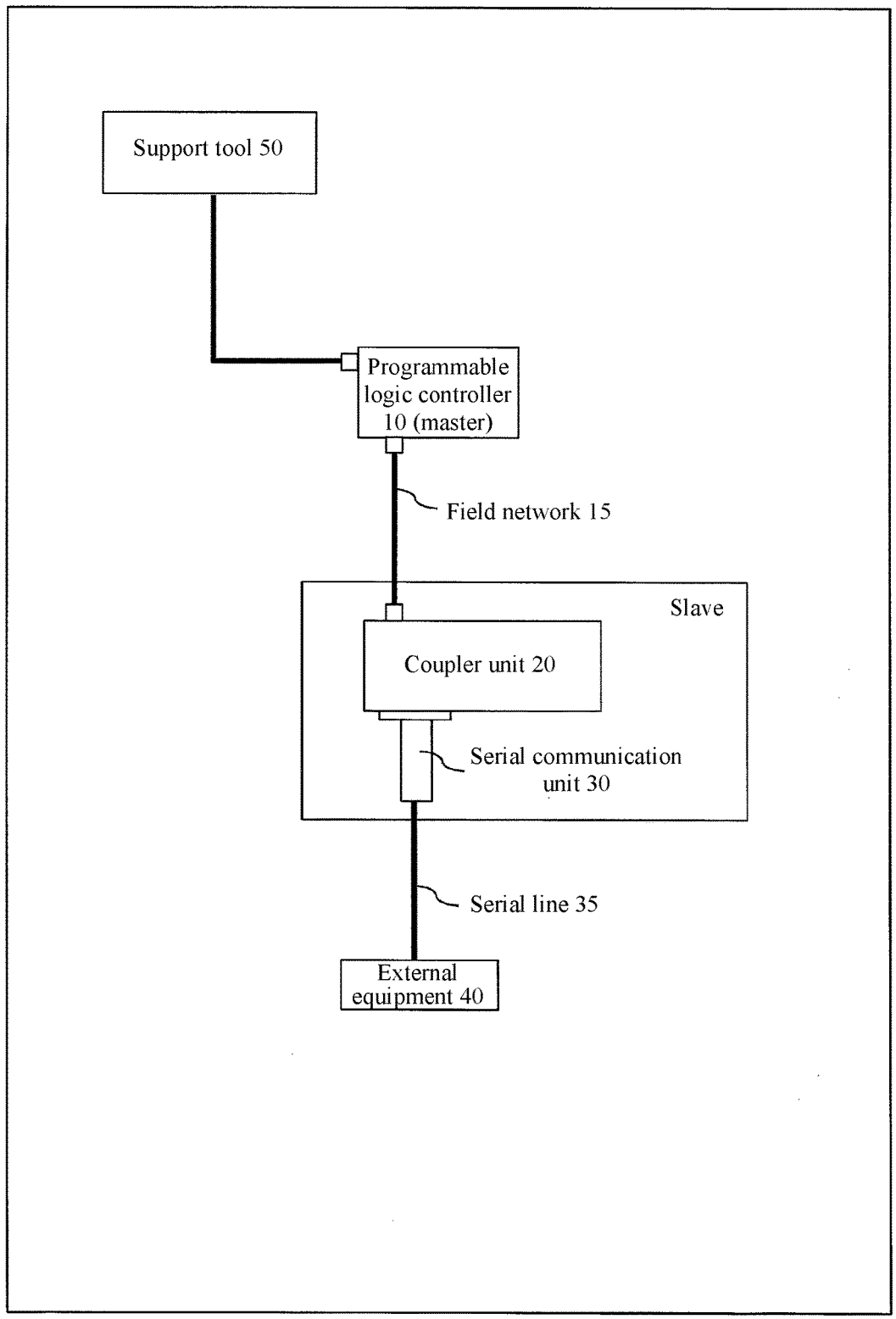
FIG. 1 is a block diagram of a connection structure of a programmable logic controller and other device.
Figure 2:
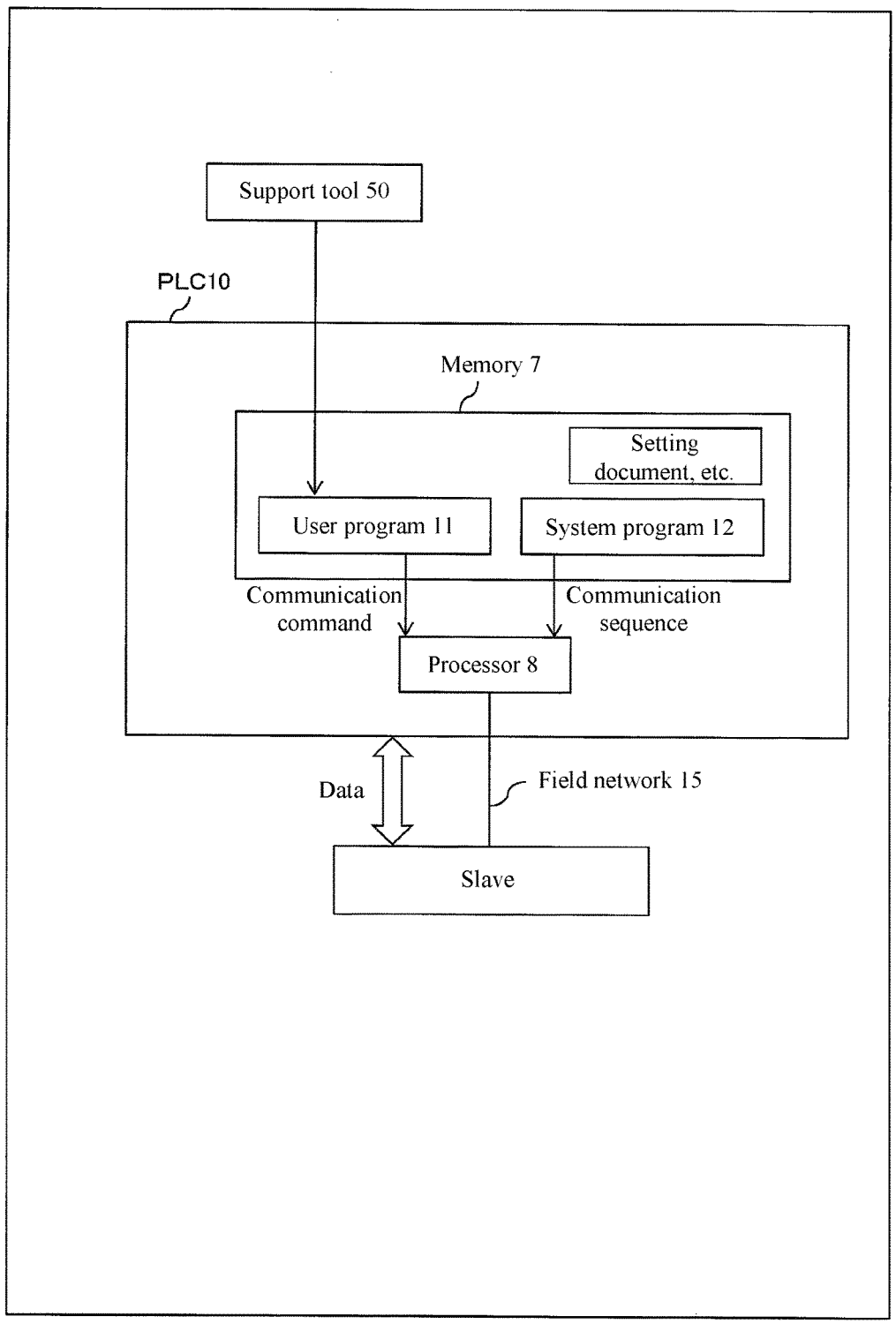
FIG. 2 is a block diagram of a structure of the programmable logic controller.

The embodiments of the invention are described below with reference of FIG. 1 to FIG. 14. As shown in FIG. 1, a programmable logic controller (referred to as PLC hereinafter) 10 of the present embodiment is connected to a coupler unit 20 through a field network 15, and a serial communication unit 30 is connected to the coupler unit 20, and the serial communication unit 30 is connected to external equipment 40 through a serial line 35. Moreover, the PLC 10 can be connected to a support tool 50.

For an example, the field network 15 is an Ethernet control automation technology (Ethernet CAT: trademark) network, the PLC 10 is an Ethernet CAT master, and the coupler unit 20 is an interface used for implementing process data communication (process data objects (PDO) communication) between the PLC 10 and the serial communication unit 30 on the Ethernet CAT network.

The PLC 10 serving as the master manages the field network 15, and monitors states of slaves (the coupler unit 20 and the serial communication unit 30), or performs PDO communication with the slaves.

The serial communication unit 30 performs the PDO communication with the PLC 10 through the coupler unit 20, and performs serial communication with the external equipment 40 (serial communication equipment) through the serial line 35. The support tool 50 connected to the PLC 10 is a terminal (computer, etc.) running support software, and the user uses the support software to set the field network 15 and the slaves, or produce a user program sent to the PLC 10, or produce a setting document, etc.

The PLC 10 has a memory 7 and a processor 8, the memory 7 saves a user program 11 sent by the support tool 50 and a system program 12.

In the user program 11, a communication command (for example, a sending command or a receiving command) with the external equipment 40 is recorded. Moreover, in the system program 12, a specific communication sequence corresponding to the communication command is recorded, and the processor 8 reads the communication command from the user program 11 to execute the communication sequence recorded in the system program 12. In this way, the PLC 10 performs the PDO communication with the slaves (the coupler unit 20 and the serial communication unit 30) through the field network 15.

Figure 3A:
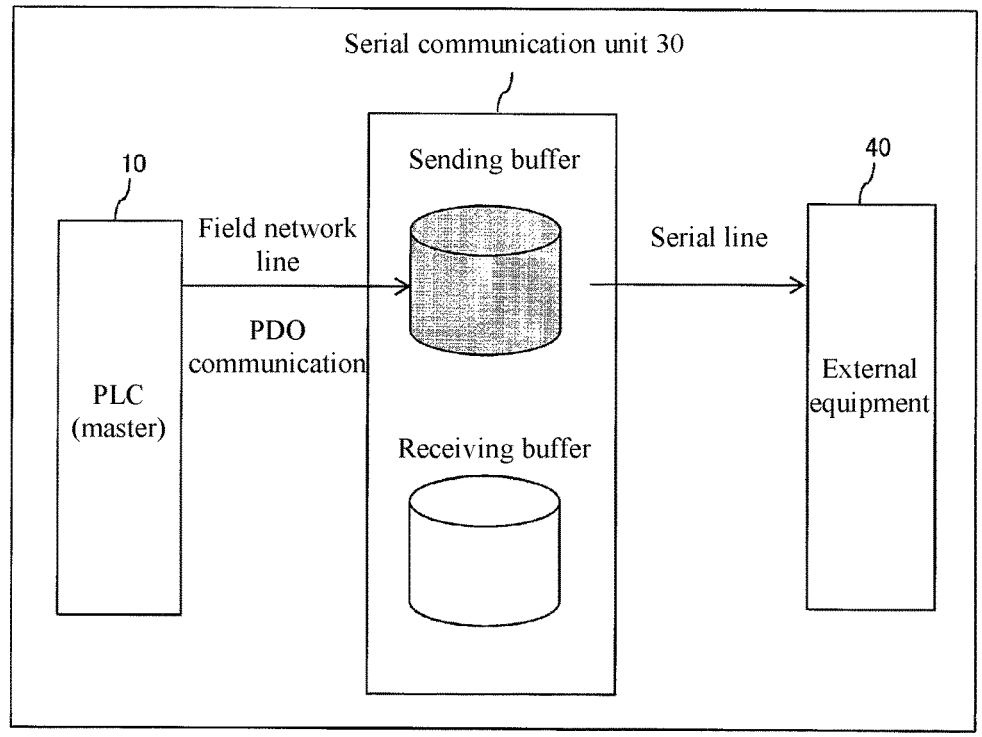
FIG. 3a and FIG. 3b are schematic diagrams illustrating data sending/receiving between the programmable logic controller and the external equipment through the serial communication unit.

When the PLC 10 send data, as shown in FIG. 3a, the sending data coming from the PLC 10 is sequentially transferred to a buffer of the serial communication unit 30 through the field network 15 during each process data communication period, and is then sent to the serial line 35.

Figure 3B:
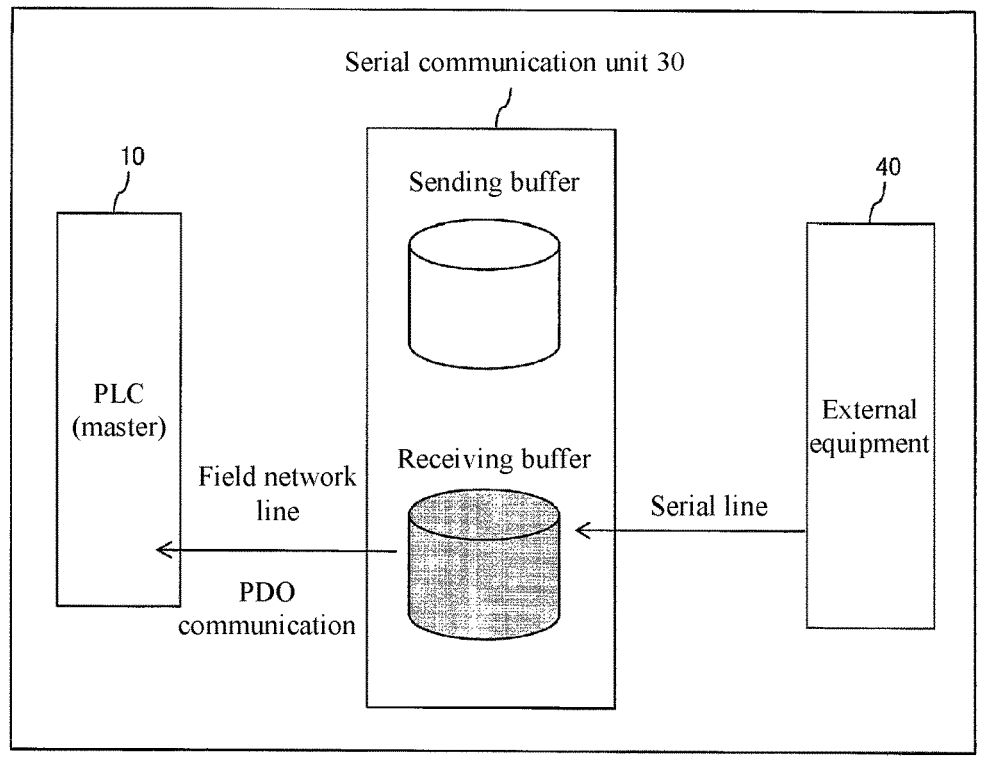

Moreover, when the PLC 10 receives data, as shown in FIG. 3b, the receiving data coming from the serial line 35 is saved to the buffer of the serial communication unit 30, and is then transferred to the PLC 10 through the field network 15 during each process data communication period.

Figure 4:
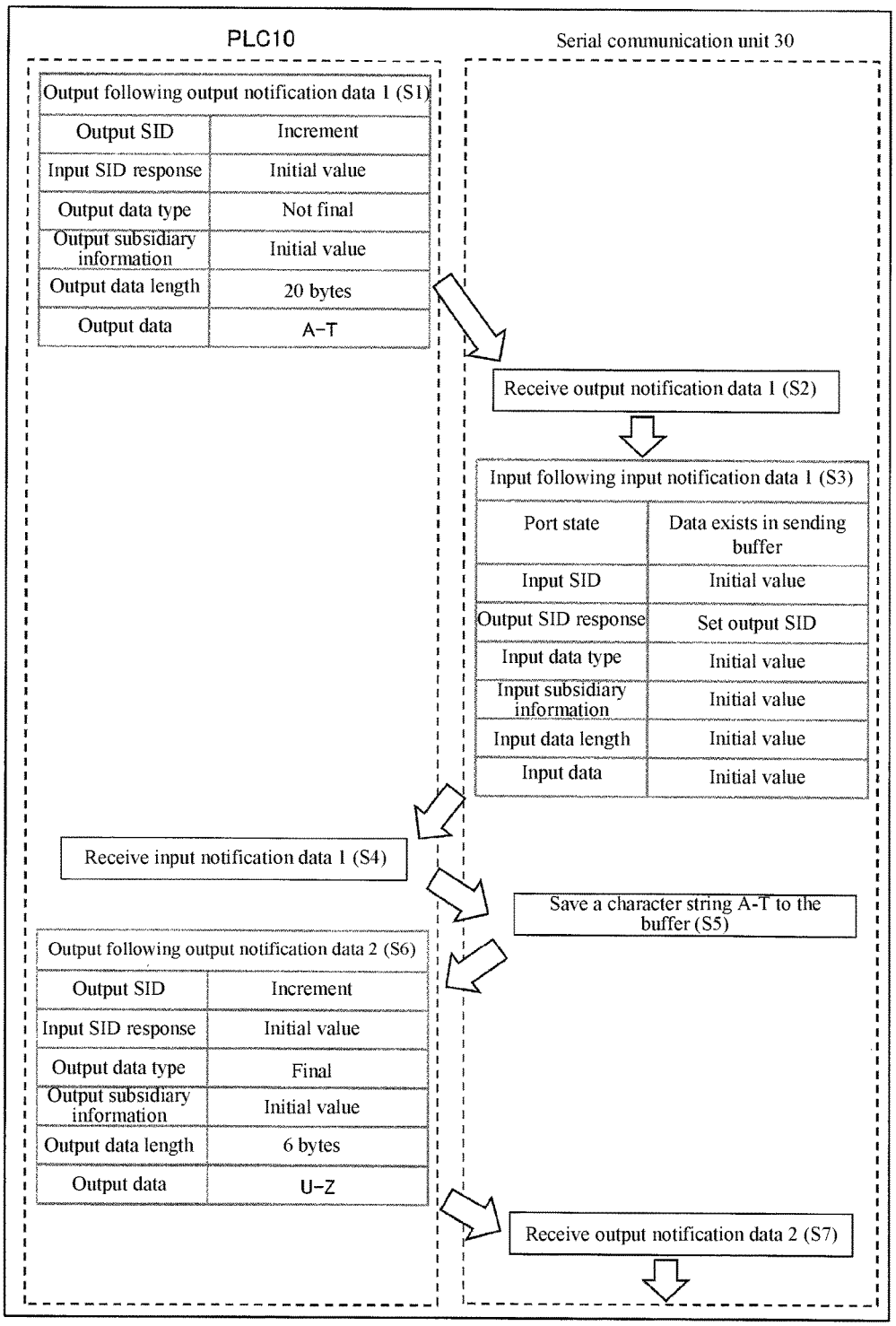
FIG. 4 is a flowchart illustrating a communication sequence between the programmable logic controller and the serial communication unit (front half steps in data sending).
Figure 5:
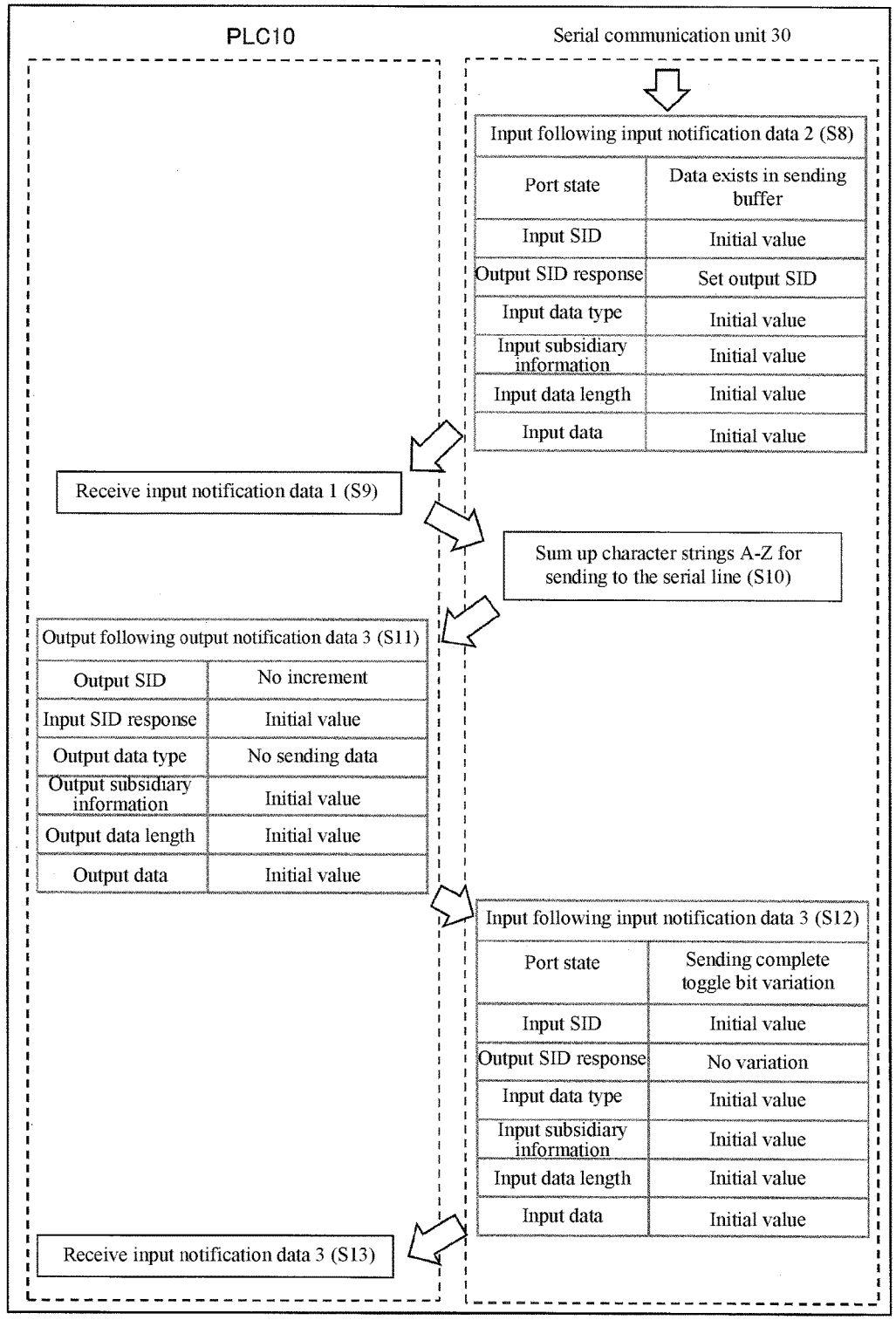
FIG. 5 is a flowchart illustrating a communication sequence between the programmable logic controller and the serial communication unit (rear half steps in data sending).

FIG. 4 and FIG. 5 are flowcharts illustrating an example of a sending sequence (sending of a character string A-Z).

First, in step S1, the PLC 10 produces output notification data 1 (output SID=a value of "increment"/input SID response=initial value/output data type=a value of "not final"/output subsidiary information=initial value/output data length=20 bytes/output data=character string A-T), and outputs the same to the field network 15.

Then, in step S2, the serial communication unit 30 receives the output notification data 1.

Then, in step S3, the serial communication unit 30 inputs input notification data 1 (port state=a value of "sending data existed in the buffer"/input SID=initial value/output SID response=a value of "setting output SID"/input data type=initial value/output subsidiary information=initial value/input data length=initial value/input data=initial value) to the field network 15.

Then, in step S4, the PLC 10 receives the input notification data 1, and learns that the serial communication unit 30 normally receives the character string A-Z according to the value of the output SID response.

Then, in step S5, the serial communication unit 30 saves the character string A-Z to the buffer of itself (referring to FIG. 3a).

Then, in step S6, the PLC 10 produces output notification data 2 (output SID=a value of "increment"/input SID response=initial value/output data type=a value of "final"/ output subsidiary information=initial value/output data length-6 bytes/output data=character string U-Z), and outputs the same to the field network 15.

Then, in step S7, the serial communication unit 30 receives the output notification data 2.

Then, in step S8, the serial communication unit 30 inputs input notification data 2 (port state=a value of "sending data existed in the buffer"/input SID=initial value/output SID response=a value of "setting output SID"/input data type=initial value/output subsidiary information=initial value/input data length=initial value/input data=initial value) to the field network 15.

Then, in step S9, the PLC 10 receives the input notification data 2, and learns that the serial communication unit 30 normally receives the character string U-Z according to the value of the output SID response.

Then, in step S10, the serial communication unit 30 saves the character string U-Z to the buffer of itself, and since the output data type of the output notification data 2="final", the character strings A-Z are summed up for sending to the serial line 35 (referring to FIG. 3a).

Then, in step S11, the PLC 10 produces output notification data 3 (output SID=a value of "no increment"/input SID response=initial value/output data type=a value of "no sending data"/output subsidiary information=initial value/output data length=initial value/output data=initial value), and outputs the same to the field network 15.

Then, in step S12, the serial communication unit 30 inputs input notification data 3 (port state=a value of "sending complete toggle bit variation"/input SID=initial value/output SID response=a value of "no variation"/input data type=initial value/output subsidiary information=initial value/input data length=initial value/input data=initial value) to the field network 15, and notifies the situation of sending the character string A-Z to the serial line 35 to the PLC 10.

Then, in step S13, the PLC 10 receives the input notification data 3, and learns the situation that the serial communication unit 30 has sent the character string A-Z to the serial line 35 according to the value of the port state="sending complete toggle bit variation".

As described above, when the PLC 10 (the processor 8 of the PLC 10) reads the sending command of the user program 11, the PLC 10 executes the sending sequence (S1, S4, S6, S9, S11, S13) recorded in the system program 12.

Figure 6:
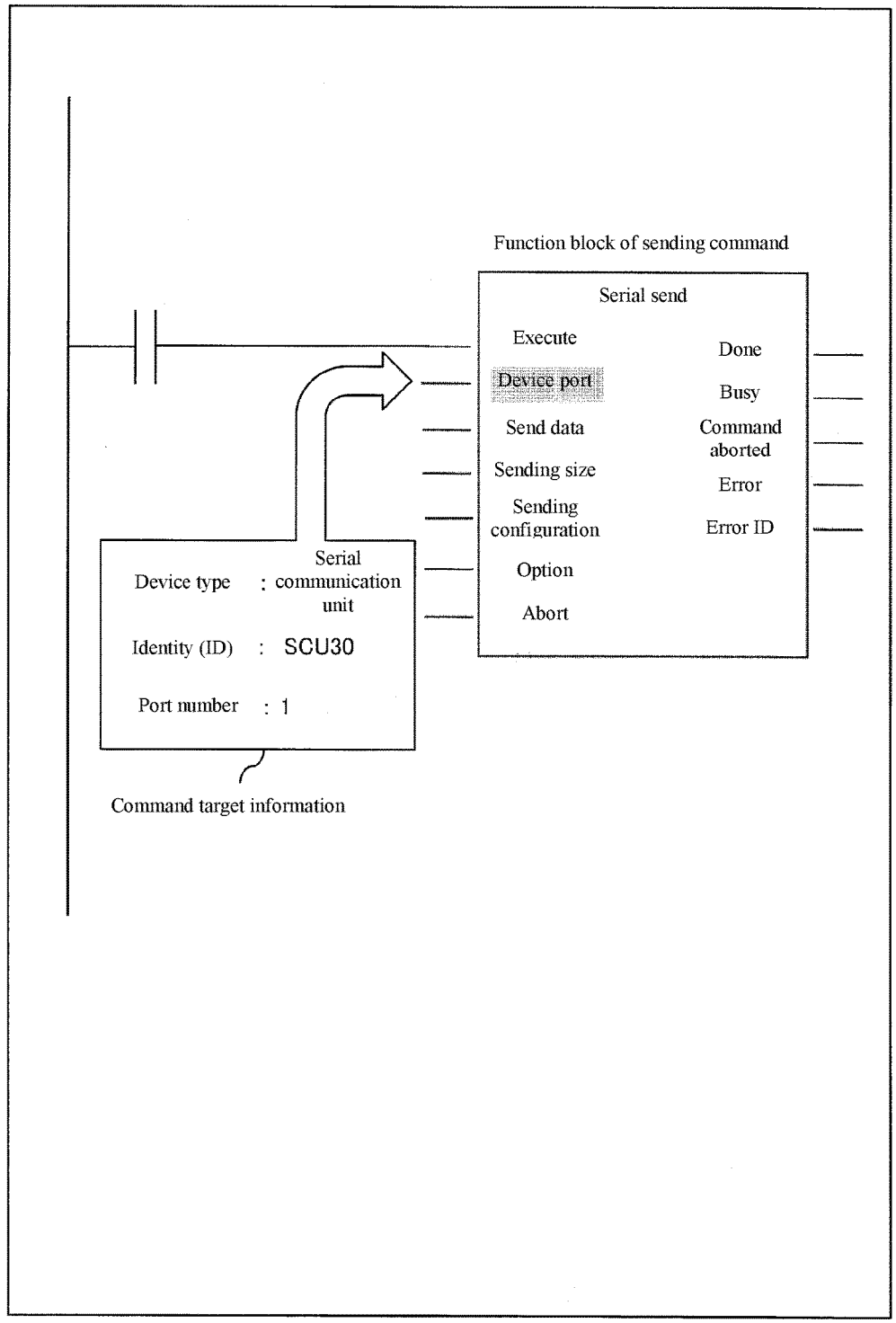
FIG. 6 is a diagram illustrating a function block of a sending command and a recording example of a user program using the function block.

The sending command of the user program 11 is as that shown in FIG. 6, and can be recorded by using a function block, and can be inserted in a ladder circuit diagram.

Figure 7:
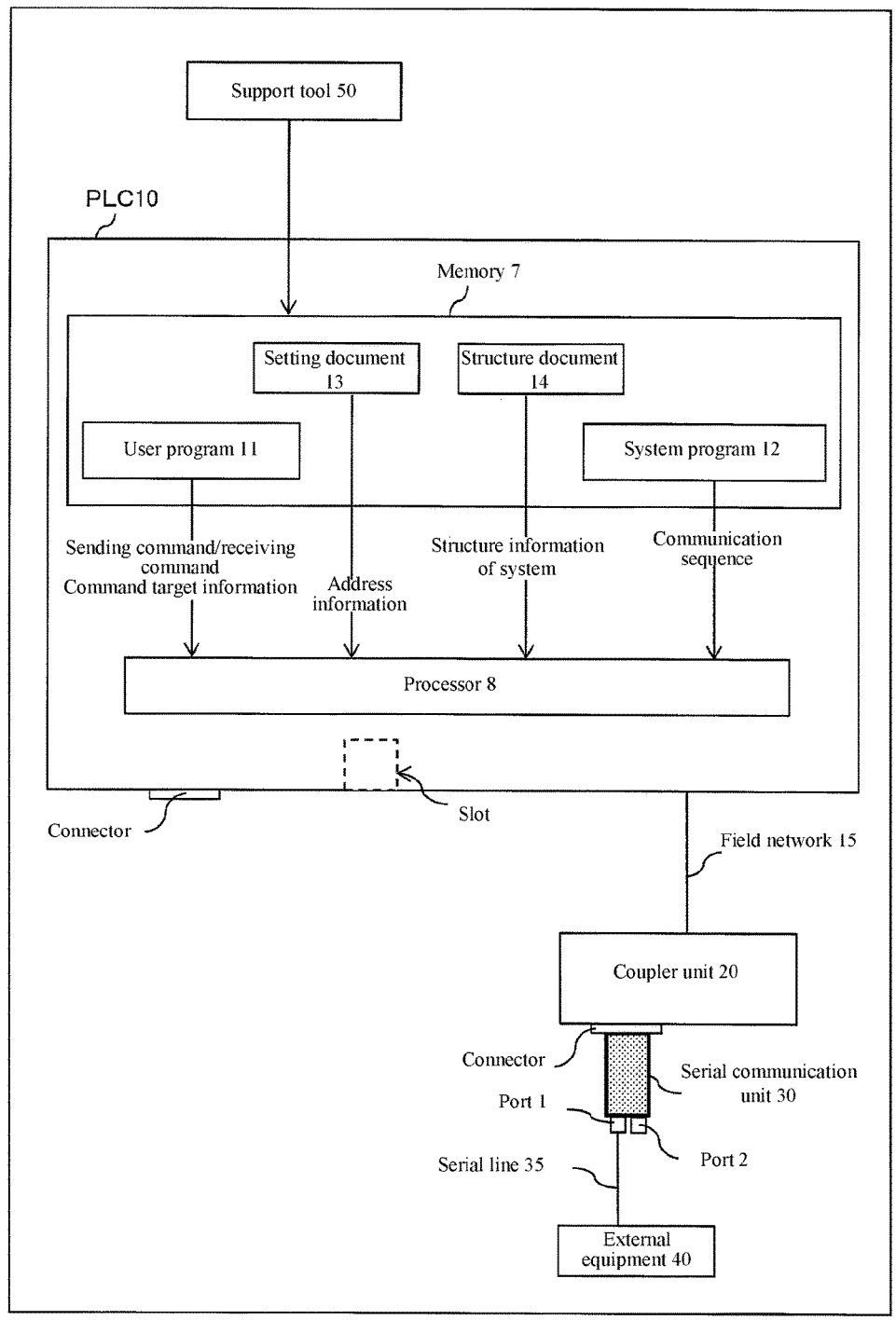
FIG. 7 is a block diagram illustrating a principle of constructing a communication path of the communication command (a programmable logic controller (PLC)→a serial communication unit installed on the coupler unit).

In the function block of the sending command, an input variable of a device port is prepared, and the command target information is input to the input variable. The command target information refers to a device type of a command target, an identity (ID) of the command target and an object port number (a port communicating with the PLC 10 and connected to the external equipment) of the command target. As shown in FIG. 7, in case that the serial communication unit 30 in the coupler unit 20 installed on the field network is taken as the command target of the sending command, in the user program 11, based on the specification of FIG. 6, the device type is the serial communication unit, the ID is SCU 30, and the port number is 1.

The processor 8 of the PLC 10 constructs a communication path of the serial communication unit 30 in the coupler unit 20 installed on the field network 15 based on the sending command and the command target information read from the user program 11, address information (a distribution target of the input variable SCU 30: a connector of the coupler unit 20) corresponding to the command target information that is read from the setting document 13 set by the user, structure information of a system (a system connected to the serial communication unit 30) that is read from a structure document 14 set by the user, and a communication sequence corresponding to the sending command that is read from the system program 12, and executes the communication sequence (to be specific: the sending sequence).

Figure 8:
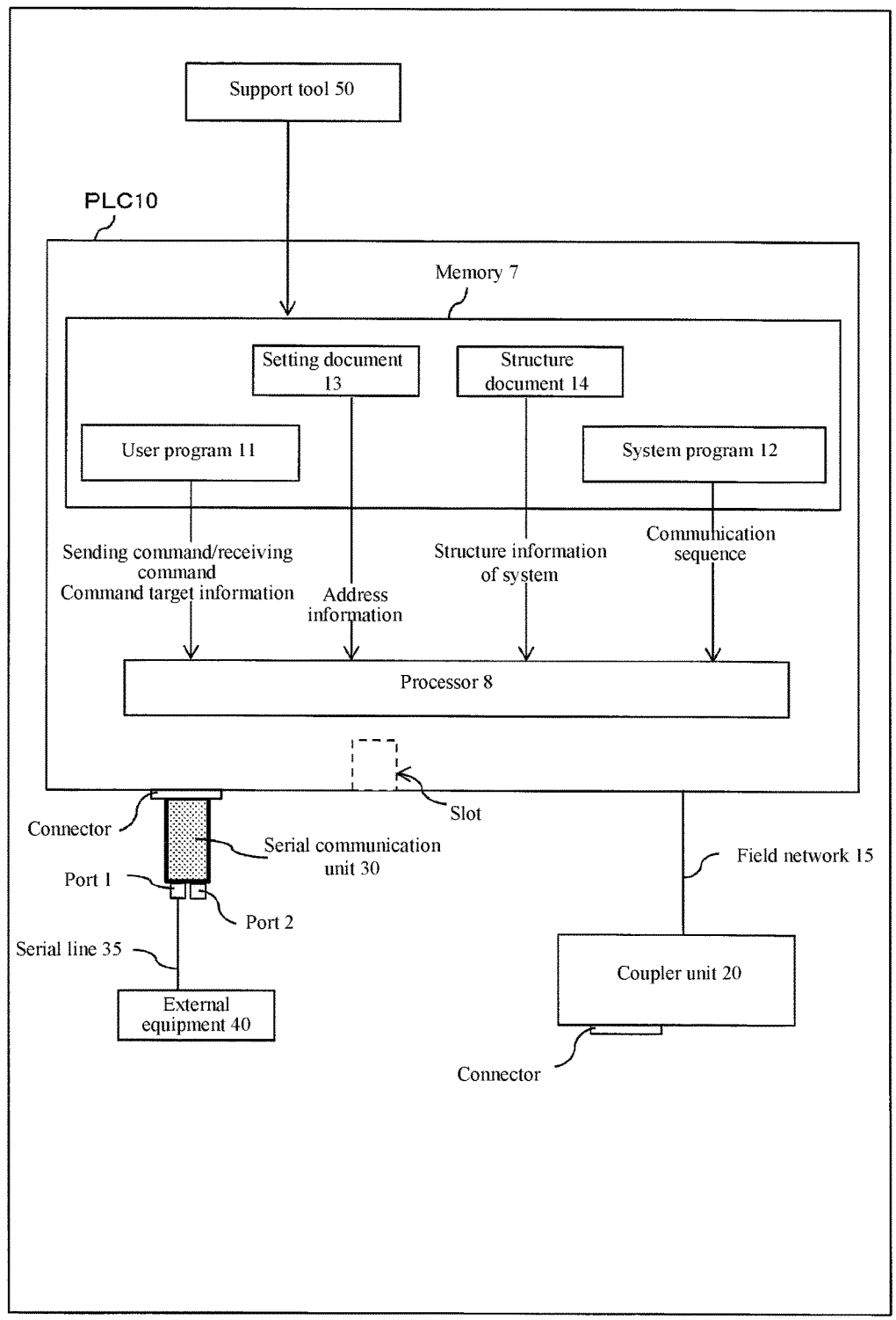
FIG. 8 is a block diagram illustrating a principle of constructing a communication path of the communication command (a PLC→a serial communication unit directly installed on the PLC).

The present embodiment has following advantages: even if the serial communication unit 30 is changed to be directly installed in the connector of the PLC 10 as that shown in FIG. 8, the record of the user program of FIG. 6 is unnecessary to be changed, and only the address information of the setting document 13 is required to be changed (the distribution target of the input variable SCU 30 is changed from the connector of the coupler unit 20 to the connector of the PLC 10). Moreover, the setting document 13 or the structure document 14 can be produced by using the support tool 50.

Figure 9:
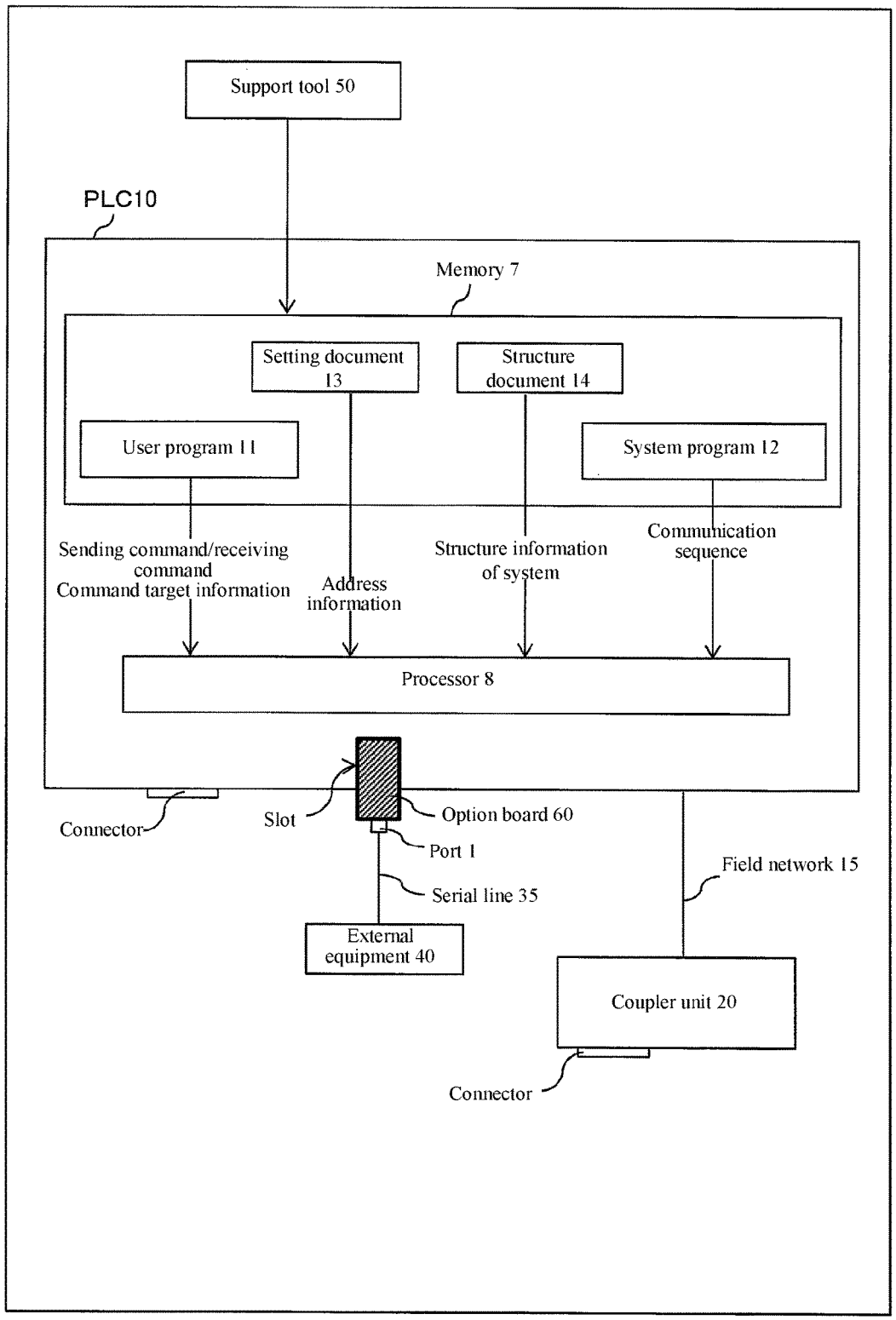
FIG. 9 is a block diagram illustrating a principle of constructing a communication path of the communication command (a PLC→an option board installed in a slot of the PLC).
Figure 10:
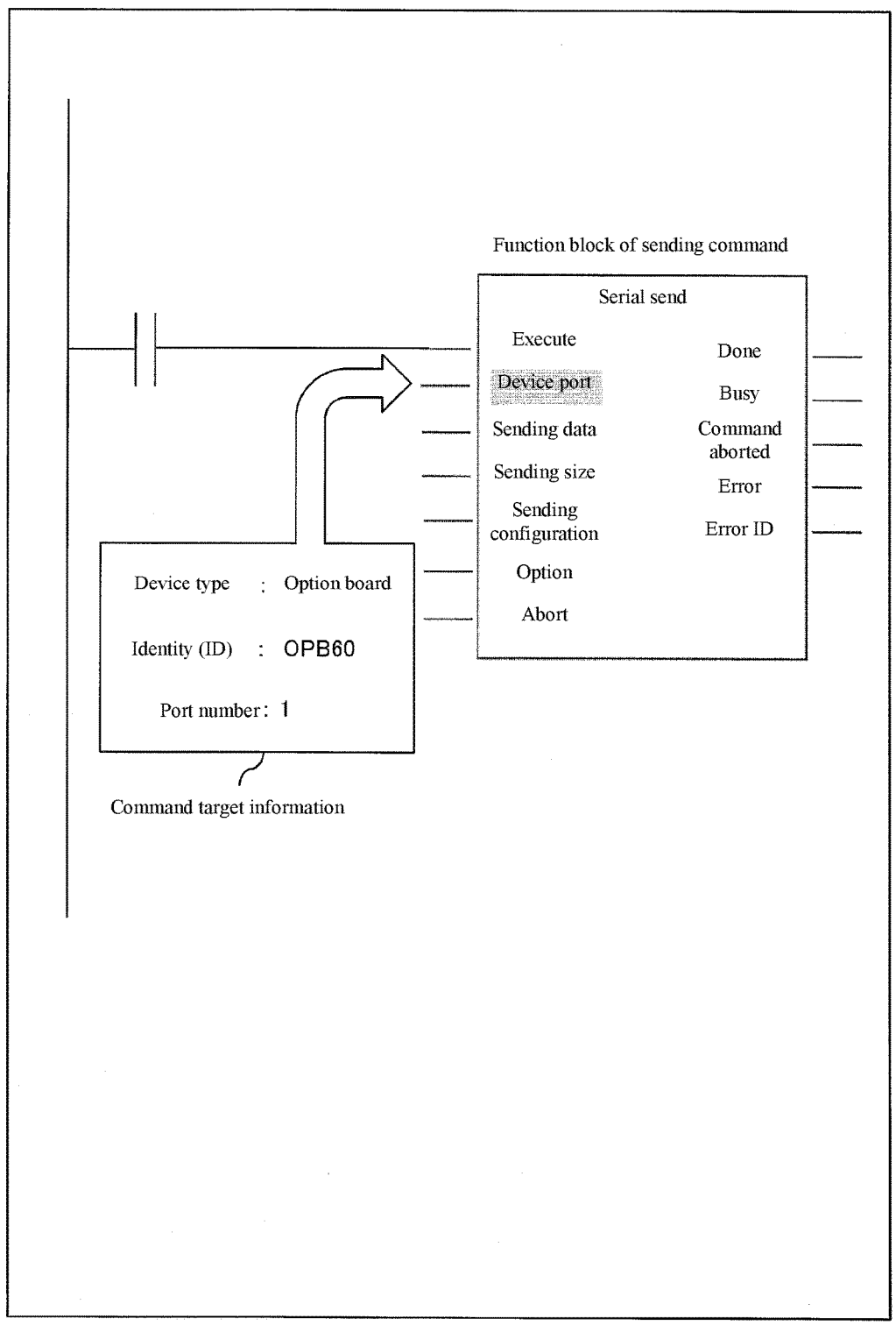
FIG. 10 is a diagram illustrating a changing content of a user program (sending command) when a structure of FIG. 9 is adopted.

Therefore, the present embodiment has following advantages: as shown in FIG. 9, even in case that the external equipment 40 is connected to an option board 60 installed in a slot of the PLC 10, and the command target is changed to the option board 60, as show in FIG. 10, it is only required to change the device type in the user program 11 to the option board and change the ID to OPB 60. Moreover, distribution of the OPB 60 is taken place in the setting document 13 (the slot of the PLC 10).

Figure 11:
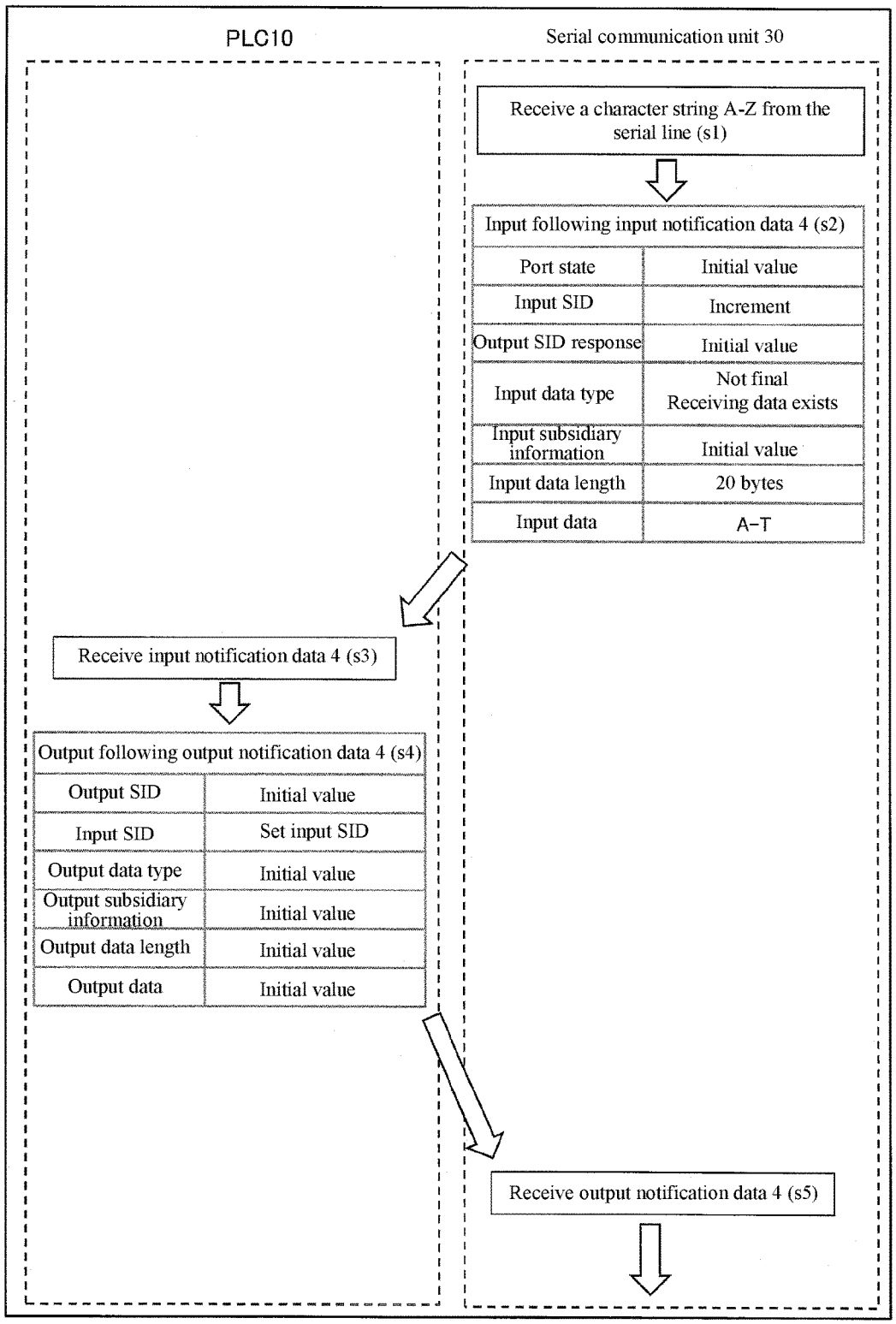
FIG. 11 is a flowchart illustrating a communication sequence between the programmable logic controller and the serial communication unit (front half steps in data reception).
Figure 12:
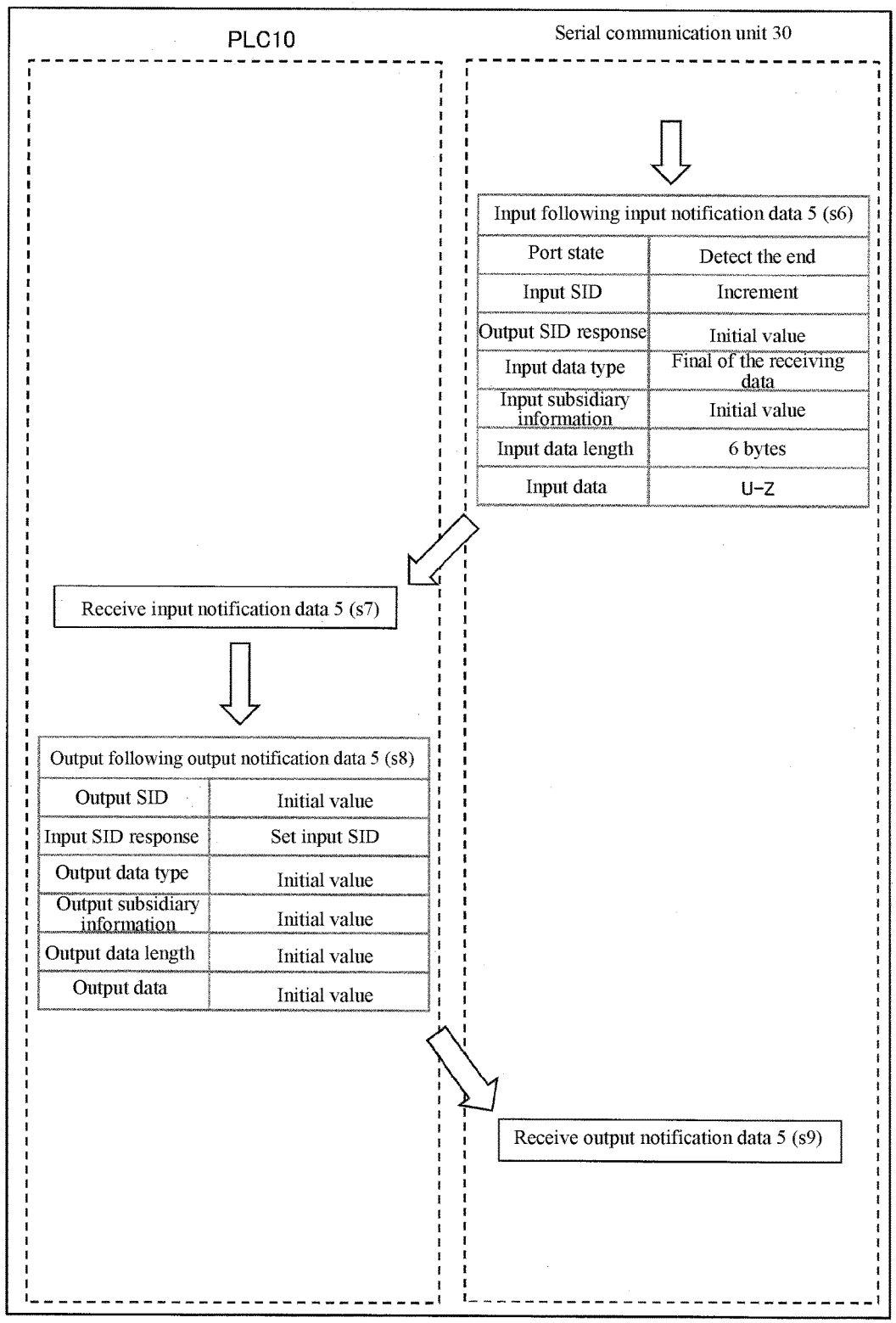
FIG. 12 is a flowchart illustrating a communication sequence between the programmable logic controller and the serial communication unit (rear half steps in data reception).

FIG. 11 and FIG. 12 are flowcharts illustrating an example of a receiving sequence (receiving of the character string A-Z).

First, in step s1, the serial communication unit 30 receives the character string A-Z from the serial line 35.

Then, in step s2, the serial communication unit 30 inputs input notification data 4 (port state=initial value/input SID=increment/output SID response=initial value/input data type=a value of "non-final receiving data exists"/input subsidiary information=initial value/input data length=20 bytes/ input data=A-T) to the field network 15.

Then, in step s3, the PLC 10 receives the input notification data 4.

Then, in step s4, the PLC 10 produces output notification data 4 (output SID=initial value/input SID response=set input SID/output data type=initial value/output subsidiary information=initial value/output data length=initial value/ output data=initial value), and outputs the same to the field network 15, and notifies the situation of normally receiving the character string A-T to the serial communication unit 30.

Then, in step s5, the serial communication unit 30 receives the output notification data 4, and learns the situation that the PLC 10 has normally received the character string A-T according to the value of the input SID response.

Then, in step s6, the serial communication unit 30 inputs input notification data 5 (port state=a value of "detecting the end"/input SID=increment/output SID response=initial value/input data type=end of receiving data/input subsidiary information=initial value/input data length=6 bytes/input data=U-Z) to the field network 15.

Then, in step s7, the PLC 10 receives the input notification data 5, and learns the situation that the serial communication unit 30 has detected the end of the receiving data according to the value of the port state="detecting the end".

Then, in step s8, the PLC 10 produces output notification data 5 (output SID=initial value/input SID response=set input SID/output data type=initial value/output subsidiary information=initial value/output data length=initial value/output data=initial value), and outputs the same to the field network 15, and notifies the situation of normally receiving the character string U-Z to the serial communication unit 30.

Then, in step s9, the serial communication unit 30 receives the output notification data 5, and learns the situation that the PLC 10 has normally received the character string U-Z according to the value of the input SID response.

As described above, when the PLC 10 (the processor 8 of the PLC 10) reads the receiving command of the user program 11, the PLC 10 executes the receiving sequence (s3, s4, s7, s8) recorded in the system program 12.

Figure 13:
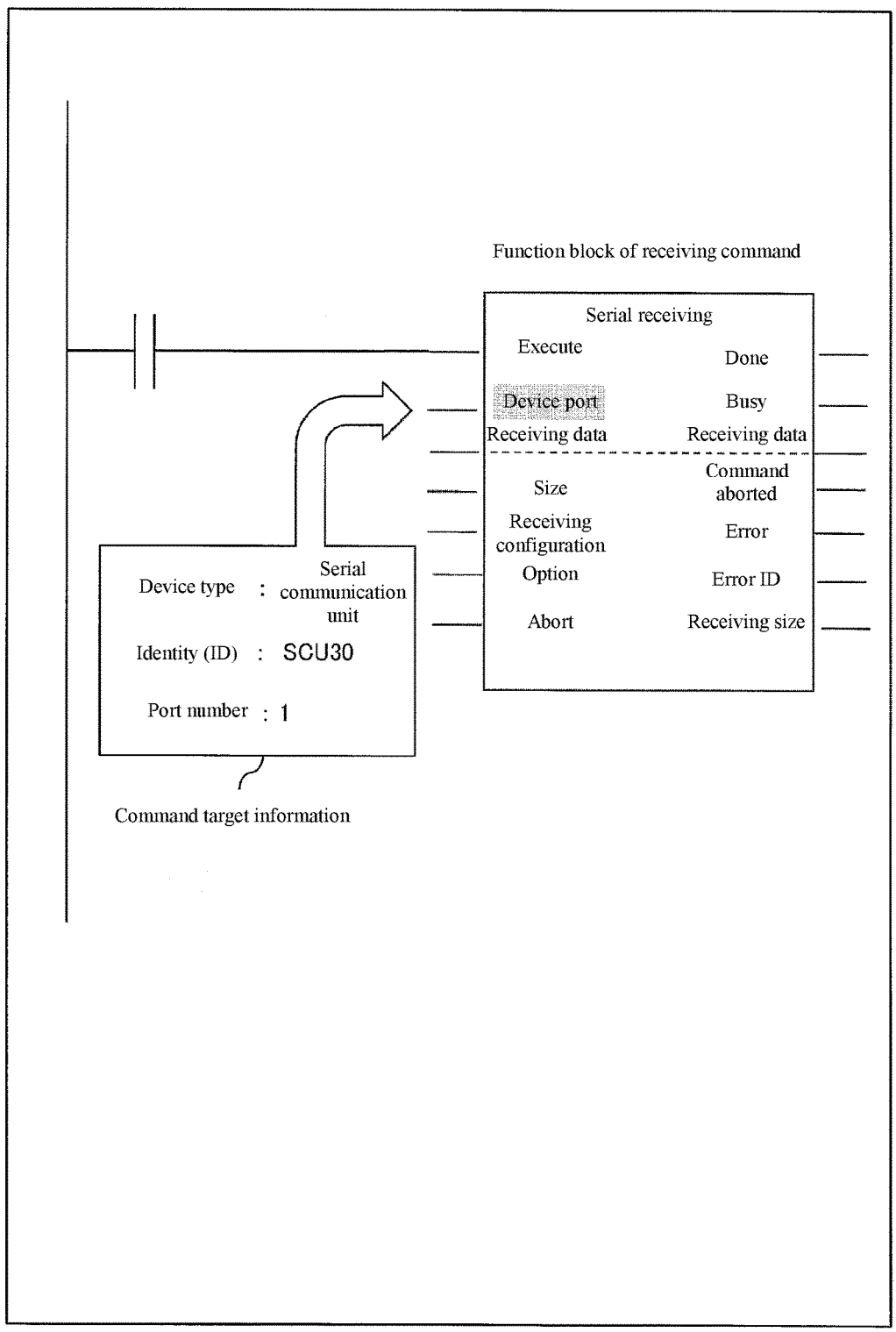
FIG. 13 is a diagram illustrating a function block of a receiving command and a recording example of a user program using the function block.

The receiving command of the user program 11 is as that shown in FIG. 13, and can be recorded by using a function block, and can be inserted in a ladder circuit diagram.

In the function block of the receiving command, an input variable of a device port is prepared, and the command target information is input to the input variable. The command target information refers to a device type of the command target, an identity (ID) of the command target and an object port number (a port communicating with the PLC 10 and connected to the external equipment) of the command target. As shown in FIG. 7, in case that the serial communication unit 30 in the coupler unit 20 installed on the field network is taken as the command target of the sending command, in the user program 11, based on the specification of FIG. 13, the device type is the serial communication unit, the ID is SCU 30, and the port number is 1.

The processor 8 of the PLC 10 constructs a communication path of the serial communication unit 30 in the coupler unit 20 installed on the field network 15 based on the receiving command and the command target information read from the user program 11, address information (a distribution target of the input variable SCU 30: a connector of the coupler unit 20) corresponding to the command target information that is read from the setting document 13 set by the user, structure information of a system (a system connected to the serial communication unit 30) that is read from the structure document 14 set by the user, and a communication sequence corresponding to the receiving command that is read from the system program 12, and executes the communication sequence (to be specific: the receiving sequence).

The present embodiment has following advantages: even if the serial communication unit 30 is changed to be directly installed in the connector of the PLC 10 as that shown in FIG. 8, the record of the user program of FIG. 13 is unnecessary to be changed, and only the address information of the setting document 13 is required to be changed (the distribution target of the input variable SCU 30 is changed from the connector of the coupler unit 20 to the connector of the PLC 10).

Figure 14:
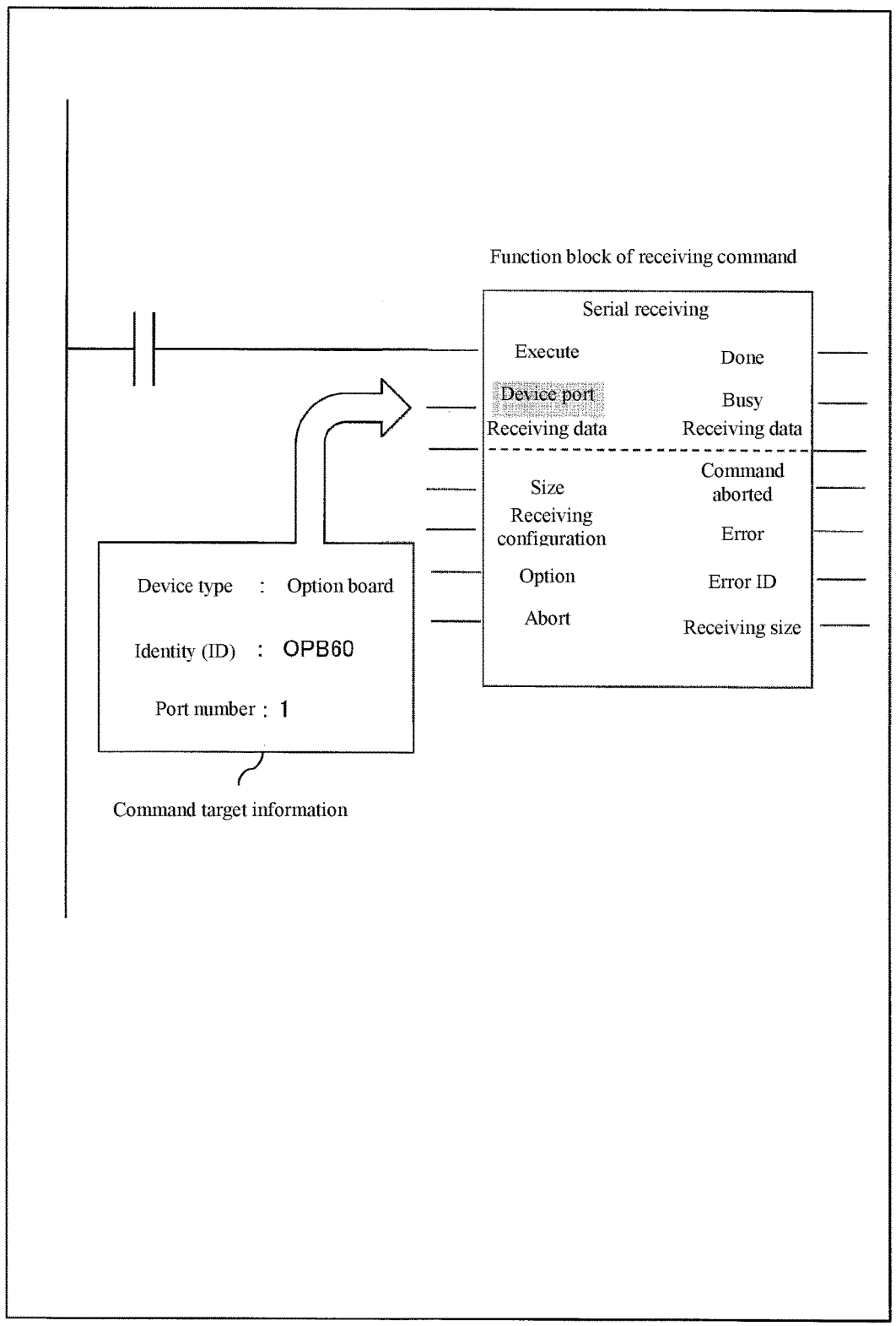
FIG. 14 is a diagram illustrating a changing content of a user program (receiving command) when a structure of FIG. 9 is adopted.

Therefore, the present embodiment has following advantages: as shown in FIG. 9, even in case that the external equipment 40 is connected to the option board 60 installed in the slot of the PLC 10, and the command target is changed to the option board 60, as show in FIG. 14, it is only required to change the device type in the user program 11 to the option board and change the ID to OPB 60. Moreover, distribution of the OPB 60 is taken place in the setting document 13 (the slot of the PLC 10).

As described above, according to the present embodiment, the command target information (the device type, ID and port number serving as the device port variable) is recorded in the user program 11, and the address information is recorded in the setting document 13, and the structure information of the system is recorded in the structure document 14, such that the time required for changing the user program 11 along with a change of the connection position of the communication interface device (the serial communication unit 30 or the option board 60) is saved. Moreover, the setting document 13 and the structure document 14 can be produced by using the support tool 50.

Moreover, according to the present embodiment, the processor 8 of the PLC 10 reads the communication command of the user program 11 to execute the communication sequence recorded in the system program 12. Therefore, in case that a change for the communication sequence exists, it is only required to change the system program 12 of the PLC 10 without a change of the side of the serial communication unit 30.

Moreover, according to the present embodiment, the processing load of the serial communication unit 30 is mitigated, such that a communication speed can be enhanced according to the capability of the PLC 10.

Moreover, according to the present embodiment, since the record of the function block shown in FIG. 6 or FIG. 13 can be adopted, producing of the user program is easy.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A programmable logic controller, connected to external equipment through a communication interface device, and the programmable logic controller comprising:
   a memory, containing a user program and a setting document, wherein the user program records both of a command for the communication interface device and command target information thereof, and the setting document saves address information corresponding to the command target information; and
   a processor, reading the user program and the setting document to execute the command for the communication interface device.

2. The programmable logic controller as claimed in claim 1, wherein the command target information comprises a type, an identity and a port number of the communication interface device.

3. The programmable logic controller as claimed in claim 1, wherein the processor executes the command based on the command target information, the address information and structure information of a system connected to the communication interface device.

4. The programmable logic controller as claimed in claim 1, wherein the command target information is an input variation of a function block of the command.

5. The programmable logic controller as claimed in claim 1, wherein the communication interface device is a serial communication unit installed on a coupler unit, or on a connector of the programmable logic controller, wherein the coupler unit is connected to the programmable logic controller through a field network.

6. The programmable logic controller as claimed in claim 1, wherein the communication interface device is communication board installed in a slot of the programmable logic controller.

7. The programmable logic controller as claimed in claim 3, wherein the memory stores a structure document recording the structure information of the system.

8. A control method of a programmable logic controller, wherein the programmable logic controller is connected to external equipment through a communication interface device, the control method of the programmable logic controller comprising:
   a step of reading a user program and a setting document, wherein the user program records both of a command for the communication interface device and command target information thereof, and the setting document saves address information corresponding to the command target information; and
   steps of processing the command for the communication interface device.

9. A control program of a programmable logic controller, wherein the programmable logic controller comprises a processor and is connected to external equipment through a communication interface device, the control program of the programmable logic controller comprising:
   making the processor to execute a step of reading a user program and a setting document, wherein the user program records both of a command for the communication interface device and command target information thereof, and the setting document saves address information corresponding to the command target information; and
   steps of processing the command for the communication interface device.

* * * * *